United States Patent [19]

Sunaga et al.

[11] Patent Number: 5,746,060
[45] Date of Patent: May 5, 1998

[54] AIR CONDITIONER FOR AUTOMOBILE USE

[75] Inventors: Hideki Sunaga; Masatoshi Suto, both of Tokyo, Japan

[73] Assignee: Calsonic Corporation, Tokyo, Japan

[21] Appl. No.: 799,929

[22] Filed: Feb. 13, 1997

[30] Foreign Application Priority Data

Feb. 15, 1996 [JP] Japan .................................. 8-028148

[51] Int. Cl.⁶ .................................................. H01H 85/04
[52] U.S. Cl. ........................... 62/126; 62/127; 62/186; 236/49.3; 236/94; 165/204; 454/75
[58] Field of Search ...................... 62/244, 125, 126, 62/127, 129, 130, 176.1, 176.2, 176.6, 186, 180; 236/49.3, 44 R, 44 A, 94; 165/202, 203, 204, 205, 42, 43; 454/75, 256, 258, 229

[56] References Cited

U.S. PATENT DOCUMENTS

| | | | |
|---|---|---|---|
| 4,381,549 | 4/1983 | Stamp, Jr. et al. | 62/126 |
| 4,448,034 | 5/1984 | Shimada et al. | 236/44 R X |
| 4,910,967 | 3/1990 | Takahashi | 62/244 X |
| 5,156,204 | 10/1992 | Doi | 165/204 |

Primary Examiner—Harry B. Tanner
Attorney, Agent, or Firm—Sughrue, Mion, Zinn, Macpeak & Seas, PLLC

[57] ABSTRACT

In the case of failure in communication between the control unit and the control panel in the manual operation of a car air conditioner, the operation mode is changed over to an automatic mode to introduce the outside air. In the case of failure in communication between the control unit and the mode door actuators, the compressor is turned on to introduce the outside air.

14 Claims, 15 Drawing Sheets

AIR CONDITIONER FOR AUTOMOBILE USE

BACKGROUND OF THE INVENTION

1. Field of the Invention

The present invention relates to an air conditioner for automobile use. More particularly, the present invention relates to an air conditioner for automobile use having a fail-safe function for preventing the windowpanes from misting.

2. Description of the Prior Art

A recent air conditioner for automobile use, which will be referred to as a car air conditioner in this specification hereinafter, includes: detectors for detecting pieces of information such as temperatures inside and outside a cabin and an amount of sunshine; and a control unit for controlling the temperature in the cabin in accordance with the temperatures detected by these detectors so that the temperature in the cabin can be automatically controlled to a desired value that has been set by a passenger. Further, a recent air conditioner for automobile use has an automatic function in which the cabin temperature and a quantity of air to be blown out are controlled, and further both the temperature and the humidity are judged so that the windowpanes of an automobile can be prevented from misting.

Even in this type car air conditioner having the automatic function, it is necessary to realize an air-conditioned state desired by a passenger which is out of the automatically controlled range. Accordingly, on a control panel of the car air conditioner, there is provided a switch to manually adjust the temperature and the quantity of air so that both the automatic control function and the manual control function can be selectively used.

In this type car air conditioner, the detectors and the actuators to be driven for actually blowing air into the cabin are connected to the control unit by communication wires. Even when the car air conditioner having the automatic control function is manually operated, it is controlled by a computer housed in the air conditioner. Therefore, the control panel is connected to the control unit. Accordingly, when the computer is disconnected from the actuator or when the computer is disconnected from the control panel for some reasons, for example, when the breaking of wire has occurred in the communication line between the control unit and the actuator or between the control unit and the control panel, or for example, when the contact failure has occurred in the switch arranged on the control panel, the presently conducted control is continued in the car air conditioner.

In the conventional car air conditioner described above, when the control unit is disconnected from the actuator or when the control unit is disconnected from the control panel, the following problems may be encountered. In the conventional car air conditioner, the presently conducted control is continued as described above. Therefore, for example, when an operation mode in which the compressor is not operated is set as an interior air circulation mode, that is, when a heating mode to be conducted in winter is set -as an interior air circulation mode, in the case of failure in the communication line, there is a possibility that the windowpanes of the car are misted according to the environment in the outside of the car, because the presently conducted operation mode is continued.

When the windowpanes are misted as described above, it is easy to solve the problem of misting by changing the operation mode to a defrosting mode. However, in the present car air conditioner, it is impossible to change the operation mode for the reasons described before.

SUMMARY OF THE INVENTION

The present invention has been accomplished to solve the above problems. It is an object of the present invention to provide an air conditioner for automobile use by which the windowpanes can be automatically prevented from misting and it is possible to realize a comfortable air-conditioned state even when the communication is cut off between the control panel and other devices.

According to the present invention, there is provided an air conditioner for automobile use comprising: a detector for detecting environment outside and inside a cabin; control means for controlling a temperature in the cabin in accordance with a detection of the detector to a temperature desired by a passenger; a compressor operating and stopping in accordance with a command given by the control means; a plurality of air conditioning executing means for executing air conditioning in the cabin; communicating means for conducting communication between the control means and the air conditioning executing means; communication judging means for judging whether the communication between the control means and the air conditioning executing means is normally conducted or not; and a mist preventing means for realizing an air conditioning state in which a windowpanes are prevented from being misted when it is judged by the communication judging means that the communication is not conducted normally.

In the aforemenioned air conditioner, the mist preventing means may include a change-over means for changing over one of the air conditioning executing means, which is judged by the communication judging means to be out of order, to the other air conditioning executing means, which is judged by the communication judging means to be in good order. In this case, there are provided an outside air introducing means for introducing outside air; and mist removing means for removing mist by blowing hot air to the windowpanes in the mist preventing means.

Further, the plurality of air conditioning executing means respectively may have execution control means, and the air conditioning executing means judged to be out of order by the communication judging means is controlled by the execution control means concerned.

Still further, the air conditioner may have a communication display means for displaying a judgment of the communication judging means, wherein the communication display means automatically displays a disorder of a communication between the air conditioning executing means and the control means judged by the communication judging means.

According to the air conditioner for automobile use according to the present invention, even when the control means can not conduct communication with the air conditioning executing means, the windowpanes can be automatically prevented from misting.

Further, when it is judged that the outlet in the air conditioning executing means can not be normally driven, mist removing is changed over from the outlet to the inlet so that the outside air can be introduced and the windowpanes can be prevented from misting.

When it is judged that the inlet can not be driven normally, mist removing is changed over from the inlet to the outlet, and hot air is blown to the windowpanes of the automobile so that the windowpanes can be prevented from misting.

Further, the plurality of air conditioning executing means respectively include the execution controlling means for controlling the air conditioning executing means themselves, and the air conditioning executing means incapable of conducting communication with the control means is controlled by the execution controlling means, so that windowpanes can be prevented from misting.

Still further, when the communication judging means judges that the air conditioning executing means and the operating means are out of order and communication can not be normally conducted, it is automatically displayed by the communication displaying means so as to let the passenger know the possibility of misting. In this way, the occurrence of misting of the windowpanes can be prevented.

DETAILED DESCRIPTION OF THE PREFERRED EMBODIMENTS

Figure 1:
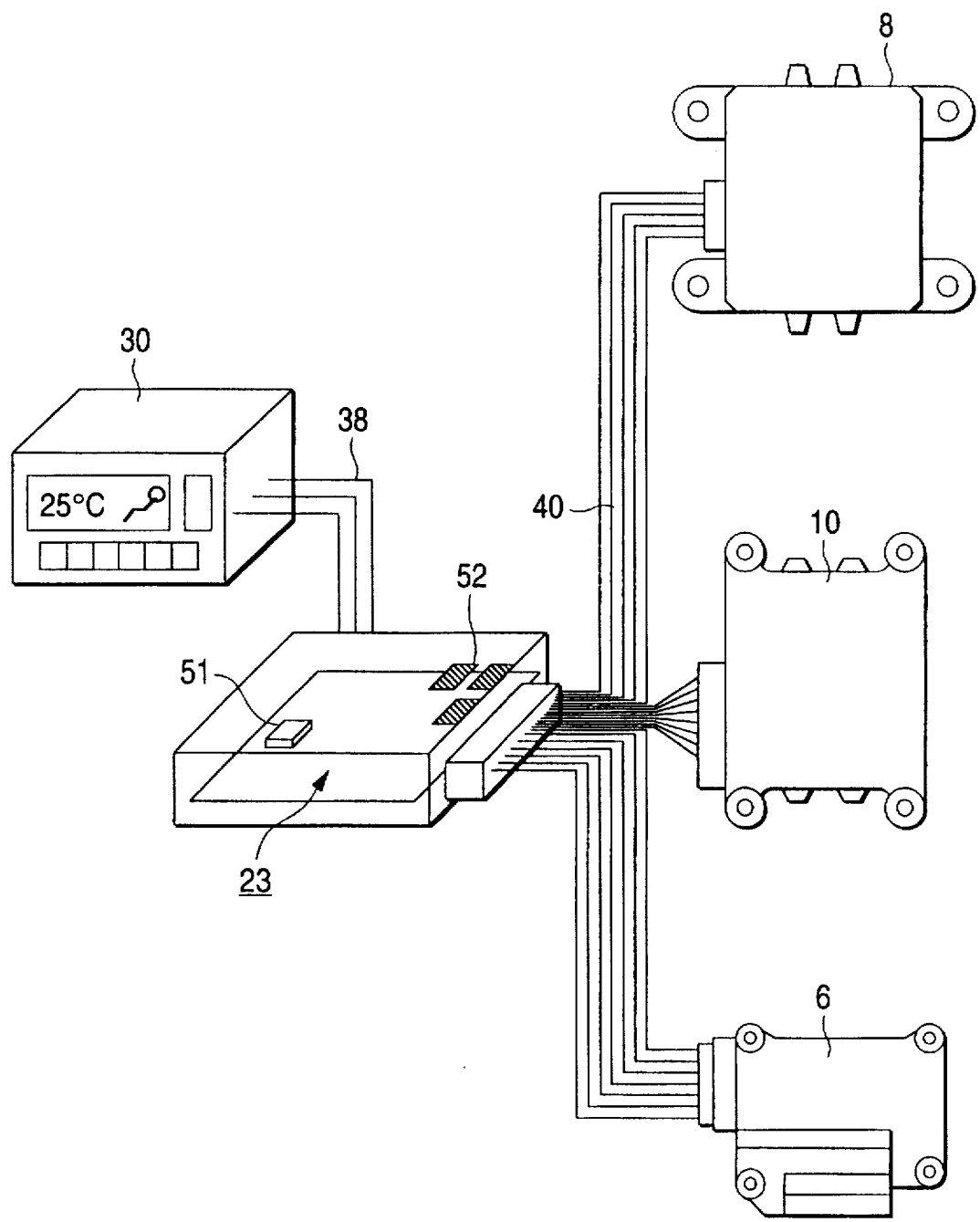
FIG. 1 is a view showing the system of the first, second and third embodiments of the present invention.

FIG. 1 is an arrangement view of the car air conditioning system illustrating its general construction in accordance with the present invention.

The arrangement of the car air conditioning system shown in this view is common among the first to the third embodiment of the present invention.

Figure 2:
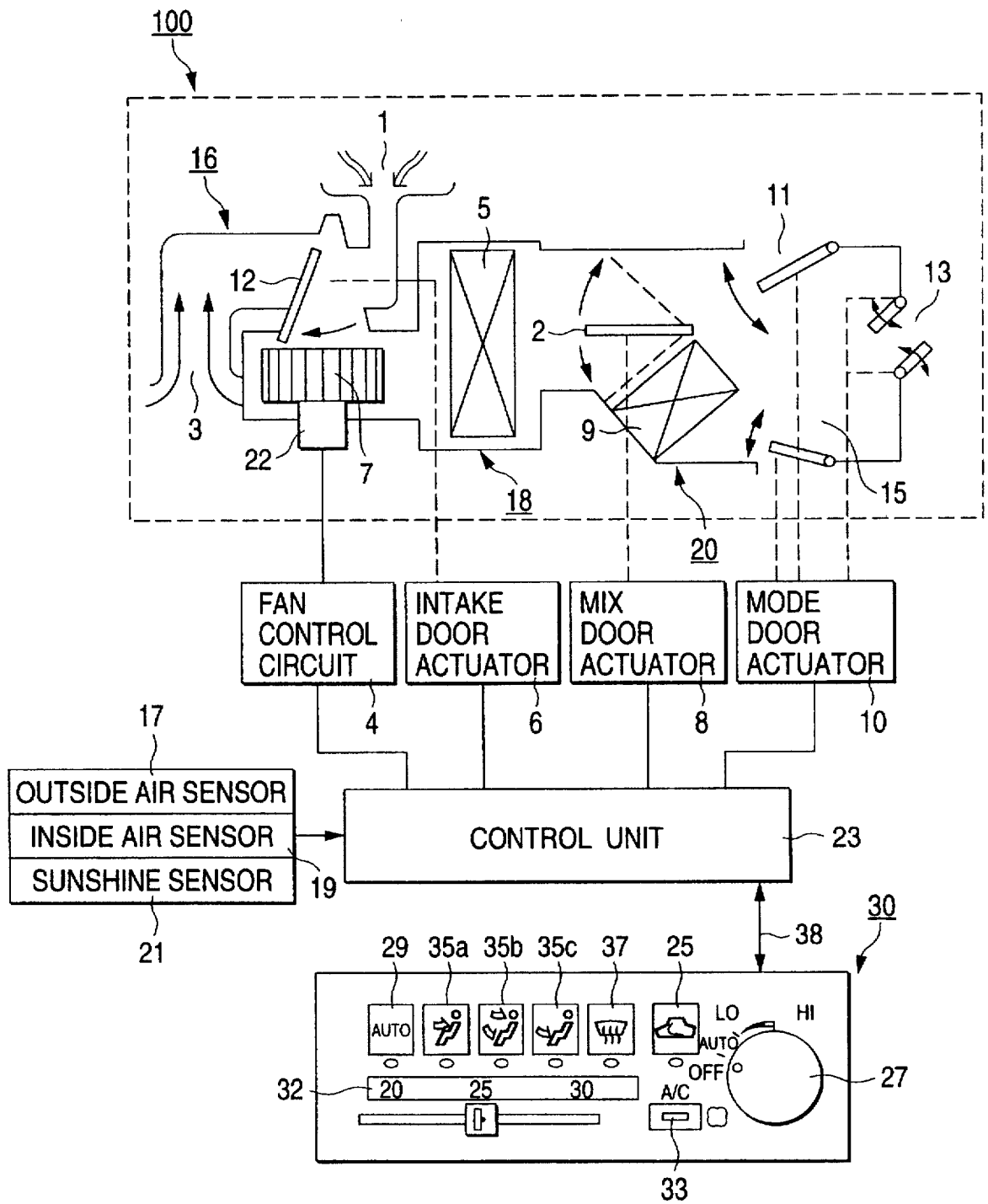
FIG. 2 is a block diagram showing the arrangement of the first and second embodiments of the present invention.

FIG. 2 is a block diagram showing an arrangement of the car air conditioner which is common between the first and the second embodiment of the present invention.

Referring to FIGS. 1 and 2, the arrangement and function of the car air conditioner of this embodiment will be explained below.

The car air conditioner system illustrated in FIG. 1 is centering around a control unit comprising a microcomputer 51 and a drive IC 52. The control unit 23 and the operation panel 30 are connected with each other by communication wires 38, so that a desired air conditioning state, which has been inputted by a passenger through the operation panel 30, can be transmitted to the control unit. The control unit 23 is connected with actuators 6, 8, 10 incorporated into the air conditioner body through communication wires 40. Therefore, the air conditioning state computed by the control unit can be realized when the actuators 6, 8, 10 are driven.

As illustrated in FIG. 2, the car air conditioner body 100 takes in the air from the outside and inside of a cabin and blows it out into the cabin after the temperature of air has been conditioned to a value desired by a passenger. The car air conditioner body 100 includes: an intake unit 16 into which air is taken from the inside and outside of the cabin; a cooler unit 18 to cool the air that has taken in; and a heater unit 20 to heat the air cooled by the cooler unit 18 to a value desired by the passenger, and the air, the temperature of which has been controlled, is blown out into the cabin.

In the intake unit 16, there are provided an air intake 3 to take in the air from the inside of the cabin, and an air intake 1 to take in the air from the outside of the cabin. At the joint portion of both intakes 3 and 1, there is provided an intake door 12 to selectively open and close both intakes 3, 1 so as to change over between the outside air introducing mode and the inside air introducing mode, and also there is provided a fan 7 to be driven by a motor 22. In the cooler unit 18, there is provided an evaporator 5 to cool the air that has been taken in by the fan 7.

In the heater unit 20, there is provided a heater 9 to heat the air that has been cooled when it passes through the evaporator 5. At the air entrance of the heater 9, there is provided a mix door 2 to adjust an amount of air passing through the heater 9.

At the rear of the heater 9, that is, on the downstream side of the heater 9, there are provided a defrosting door 13 from which air is blown out to the front window of a vehicle not shown, a ventilation door 11 from which air is blown out at the center of the instrument panel, and a foot door 15 from which air is blown out to the feet of the passenger.

In the cabin, there is provided a control panel 30, which includes: a change-over switch 29 to change over between the automatic control mode and the manual control mode of the car air conditioner body 100; a fan control button 27 to set a rotational speed of the motor 22; an inside and outside air change-over switch 25 to change over between the inside air circulation mode and the outside air introducing mode; a temperature control mode lever 32 to set the temperature in the cabin; mode switches 35a to 35c to set the mode of air conditioning; an air conditioning switch 33 to start the car air conditioner; and a defrosting mode switch 37. These lever switches are connected with the control unit 23.

This control unit 23 is connected with: a fan control circuit 4 to control the fan motor 22; an intake door actuator 6 to drive the intake door 12; a mix door actuator 8 to drive the mix door 2; a mode door actuator 10 to drive the defrosting door 13, ventilation door 11 and the foot door 15; an outside air sensor 17; an inside air sensor 19; and a sunshine sensor 21. In accordance with various signals sent from the control panel 30 and various sensors, it is possible to control a rotational speed of the fan motor 22, a setting position of the intake door 12 and a degree of opening of the mix door 2.

The control unit 23 is connected with the control panel 30 by the communication line 38, so that communication can be conducted between them. That is, through the communication line 38, the display data communication can be conducted, by which display data is sent from the control unit 23 to the control panel 30. Also, through the communication line 38, the switch state communication can be conducted, by which the state of each switch is informed from the control panel 30 to the control unit 23.

Concerning the above car air conditioner, explanations will be given about the fail-safe function which functions in the case of failure in communication between the control panel 30 and the control unit 23. In this case, the fail-safe function is defined as follows. When the inside and outside change-over switch 25 to be manually controlled on the control panel 30 and the defrosting switch 37 can not be operated, the windowpanes can be prevented from misting by the fail-safe function.

The fail-safe function which functions in the case of failure in communication between the control panel 30 and the control unit 23 is referred to as a first fail-safe function in this specification, hereinafter.

1st Embodiment

According to the present invention, there are provided two types of the first fail-safe functions. One of the two types of the first fail-safe functions is described in the first embodiment of the present invention. The first embodiment will be explained below.

According to the fail-safe function of the first embodiment, the inputting operation conducted on the control unit 23 is automatically changed over to the automatic mode, and the outside air is introduced into the air conditioner.

Figure 3:
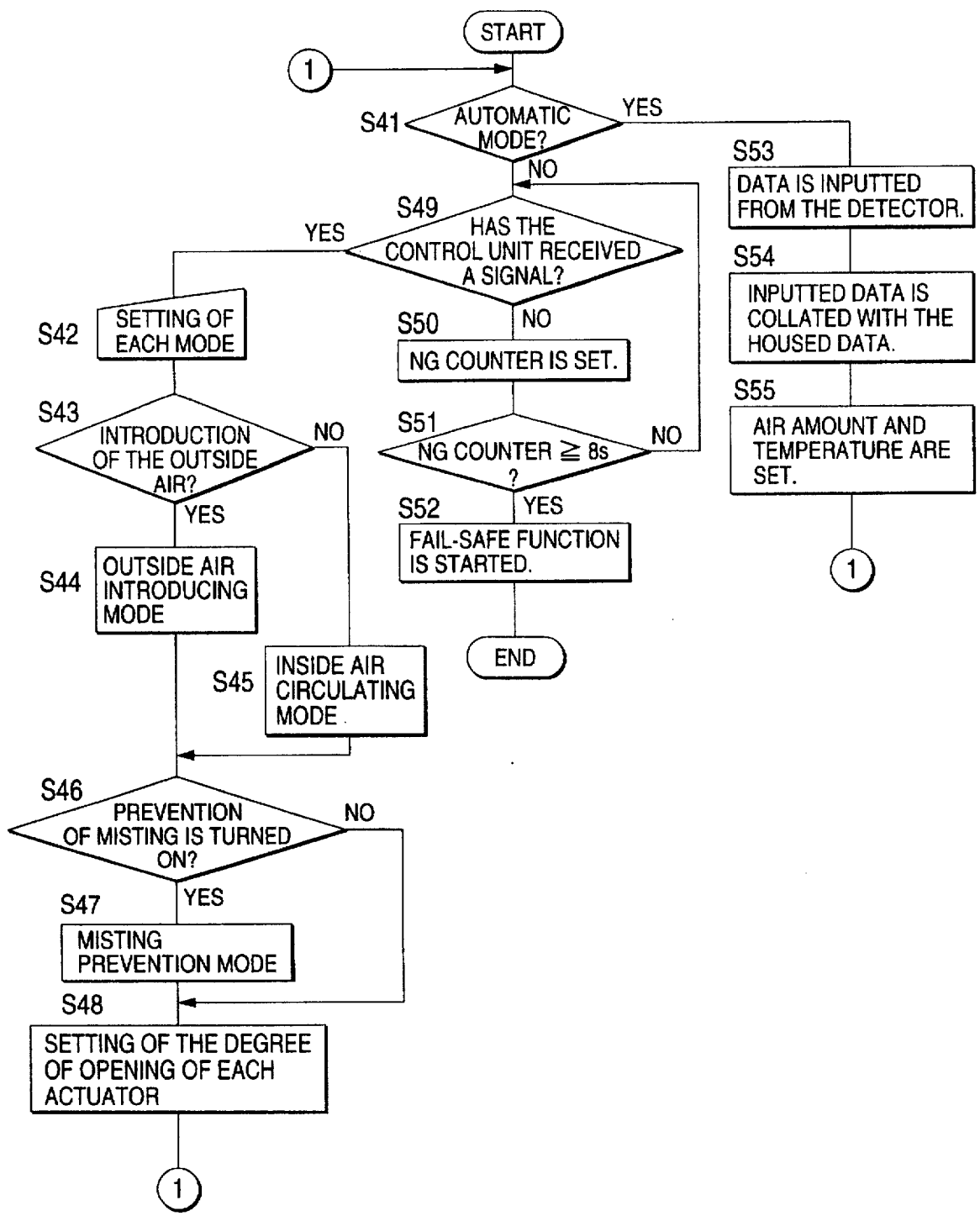
FIG. 3 is a flow chart showing the fail-safe function of the first and second embodiments of the present invention.

FIG. 3 is a flow chart on which processing to start the fail-safe function is shown. This flow chart is common in the first fail-safe function. This flow chart starts when the air conditioner is turned on.

First, the passenger usually operates the change-over switch 29 so that one of the automatic and the manual mode can be selected. By the control unit 23, it is judged whether the automatic or the manual mode is selected (S41). When it is judged that the automatic mode is selected, pieces of information about the air in the cabin obtained by the sensors such as an outside air sensor 17, inside air sensor 19 and sunshine sensor 21 are inputted into the control unit 23 (S53).

The control unit 23 houses data necessary for judging a comfortable temperature for the passenger when consideration is given to an amount of sunshine and atmospheric temperature. When the information detected by the detector is collated with the data housed in the control unit 23, it is possible to set an amount of air to be blown into the cabin and a temperature of air (S54, S55).

When it is judged that the control of the manual mode is selected, the control unit 23 checks whether or not communication is normally conducted between the switch on the control panel 30 and the control unit 23 (S49).

When it is judged that communication is normally conducted, each mode (an amount of air, a setting temperature or the like), which has been manually inputted, is inputted into the control unit 23. In addition to that, it is judged whether or not the outside air is introduced, and it is also judged whether or not the mist preventing mode is set (S42, S43, S44, S45, S46, S47). According to the above judgment, the degree of opening of each actuator is set, and the processing of air conditioning in the manual mode is completed (S48). The above processing is repeated until the operation of the car air conditioner is changed to the automatic mode by the passenger.

When a signal sent from the control panel 30 is not received by the control unit 23, an NG counter is immediately set (S50). The control unit 23 repeatedly judges whether or not a signal sent from the control panel 30 is received until a period of time of 8 seconds pass through from the start of counting (S51).

When the signal sent from the control panel 30 is received by the control unit 23 until a period of time of 8 seconds pass through from the start of counting of the NG counter, it can be judged that the car air conditioner is normally operated. Therefore, processing of the normal manual mode is conducted.

When the signal is not inputted even after a period of time of 8 seconds have passed, the program of the car air conditioner of this embodiment gets into a fail-safe subroutine so that the fail-safe function can be started (S52).

Figure 4:
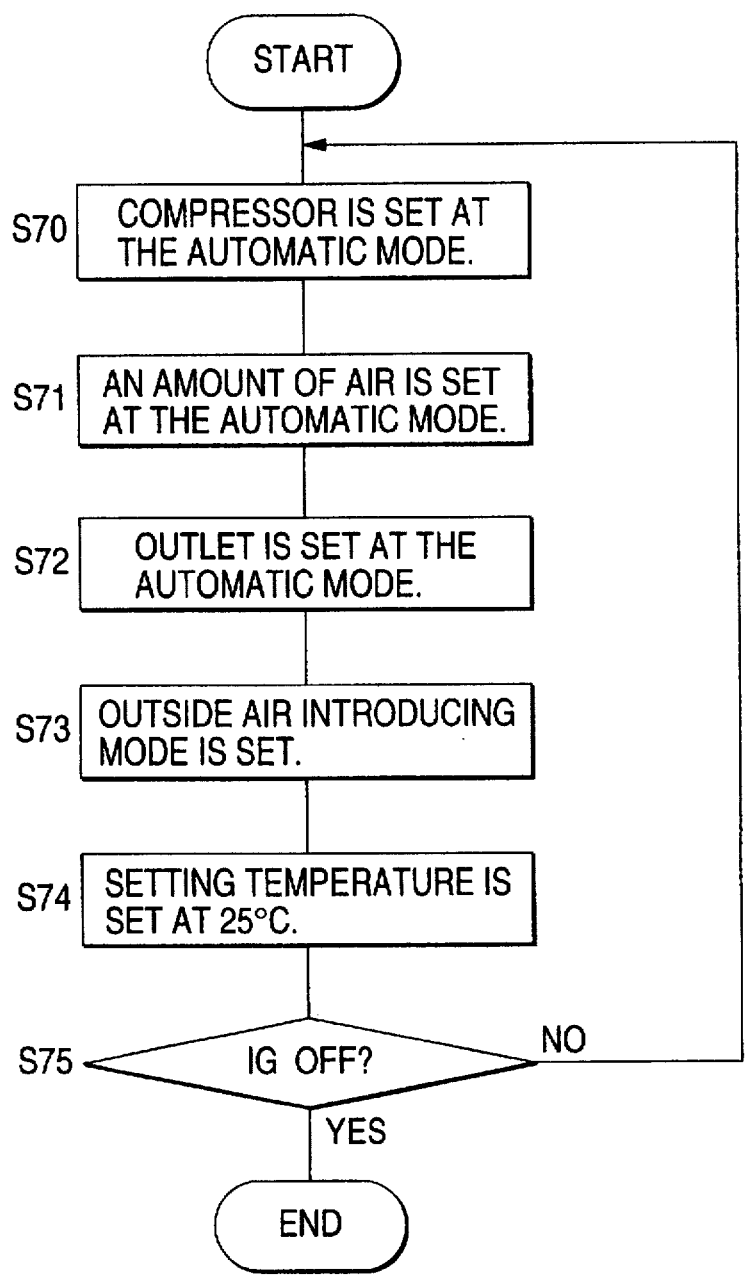
FIG. 4 is a view showing the subroutine of the first embodiment of the present invention.

FIG. 4 is a flow chart showing the subroutine of the first embodiment. The fail-safe function of this embodiment is started when the input signal is not received by the control unit 23 for 8 seconds and it is judged that the communicating function between the control panel 30 and the control unit 23 is out of order.

According to the first fail-safe function of this embodiment, immediately after the function has started, processing is conducted so that the compressor operation, the amount of air blown out from the air conditioner and the outlet of air can be set by the automatic mode (S70, S71, S72). Next, the outside air introducing mode is set to introduce the outside air, and misting on the windowpanes is removed or prevented (S73). Further, the temperature in the cabin is set at a value at which the passenger feels comfortable (S74). In this embodiment, the temperature in the cabin is set at 25° C.

The above processing is repeated until the ignition switch is turned off (S75).

According to the above embodiment, even if the windowpanes are misted and visibility is not good because of failure in communication between the control panel and the control unit, the operation mode can be automatically changed over to the automatic mode and visibility can be improved.

Even when signals inputted onto the control panel are not sent to the control unit in the case of manual operation and the passenger can not perceive the failure in signal transmission, the operation mode can be automatically set at 25° C. Therefore, the passenger can feel comfortable in the cabin.

2nd Embodiment

Next, the second embodiment in which the first fail-safe function is accomplished will be explained below.

Figure 5:
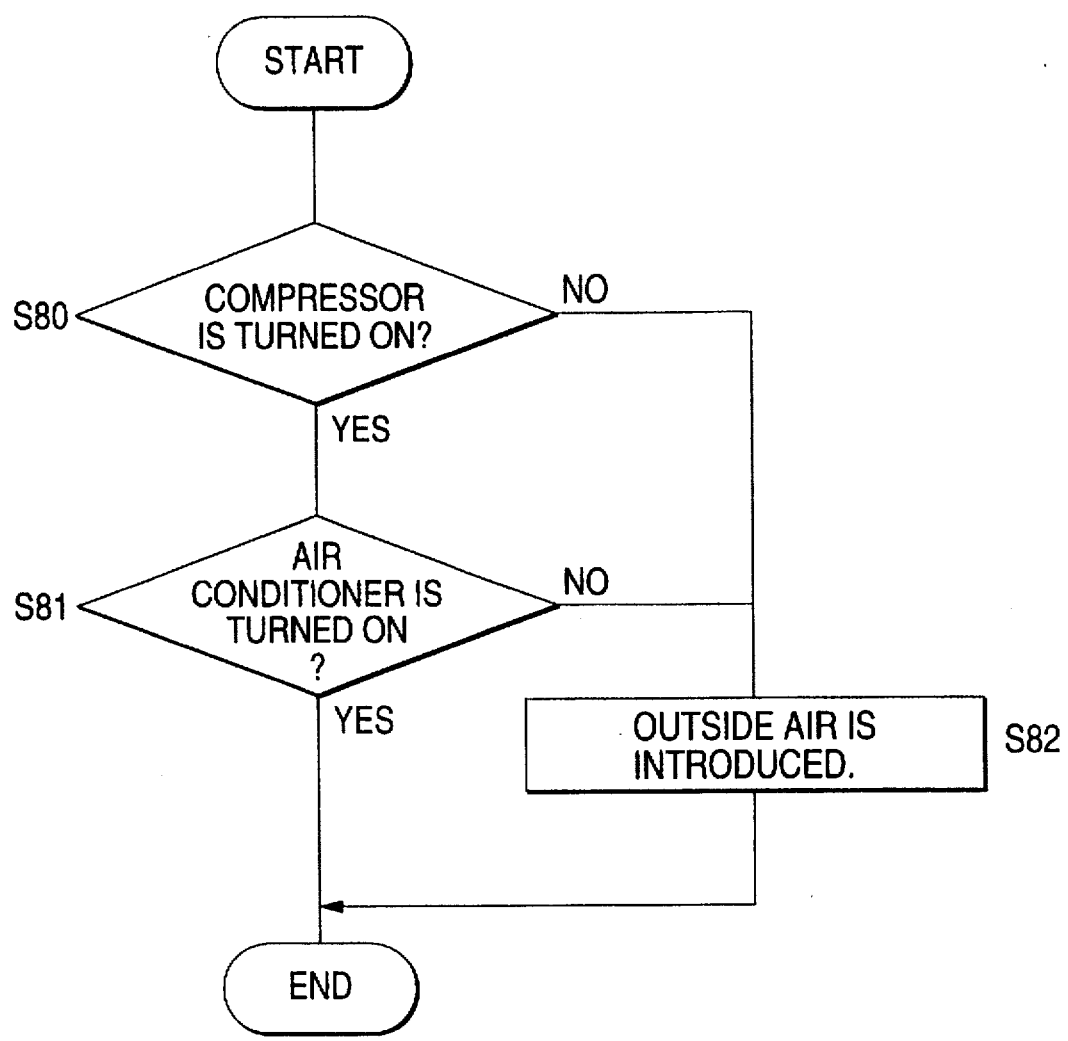
FIG. 5 is a flow chart showing the subroutine of the second embodiment of the present invention.

According to the fail-safe function of the second embodiment, outside air can be -automatically introduced into the cabin even when the compressor and the car air conditioner body 100 are stopped. As explained before, the air conditioning system and the block diagram of the second embodiment are the same as those of the first embodiment. Therefore, only the flow chart of the subroutine of the second embodiment is shown in FIG. 5.

In the second embodiment, when 8 seconds are counted by the NG counter, first, the compressor operation is judged (S80). When the compressor is turned on, the air conditioner operation is judged. When both are operated, the windowpanes are not misted. Therefore, the processing is completed as it is (S81). However, when either the compressor or the air conditioner is stopped, the outside air is immediately introduced so that the windowpanes can not be misted (S82).

According to the above embodiment, even when the windowpanes are misted and visibility becomes bad in the case of failure in communication between the control panel and the control unit, the outside air can be automatically introduced and visibility can be improved.

3rd Embodiment

Figure 6:
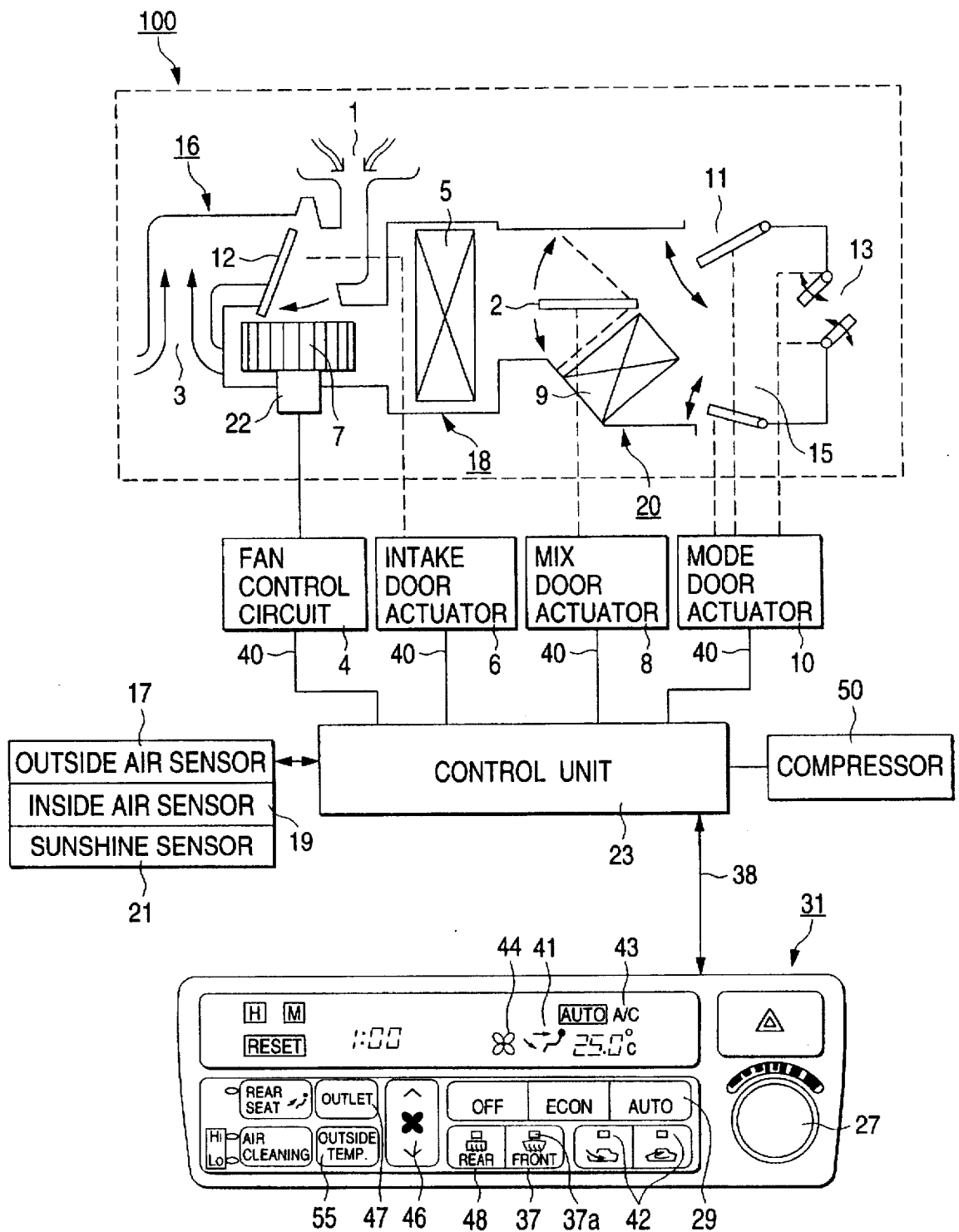
FIG. 6 is a block diagram showing the arrangement of the third embodiment of the present invention.

FIG. 6 is a block diagram of the car air conditioner of the third embodiment.

As shown in FIG. 6, the arrangement of the car air conditioner of the third embodiment is substantially the same as that of the first embodiment described before. The car air conditioner of the third embodiment comprises: a car air conditioner body 100; actuators 6, 8, 10 to drive the mode doors arranged in the car air conditioner body 100; a control unit 23 to control the actuators 6, 8, 10; and a control panel 31 by which a command can be manually inputted into the control unit 23. In this case, the car air conditioner body 100 includes: an intake unit 16 from which the outside air is taken in; a cooler unit 18 to cool the air that has been taken in; and a heater unit 20 to heat the air that has been cooled by the cooler unit 18, wherein the air of which the temperature is controlled to a value desired by a passenger is blown out from the heater unit 20 into the cabin.

The control panel 31 of this embodiment includes: a change-over switch 29 to change over the car air conditioner between the automatic control mode and the manual control mode; a fan control button 46 to set the rotational speed of the motor 22; an inside and outside air change-over switch 42 to change over between the inside air circulation mode and the outside air introducing mode; a temperature adjusting dial 27 to adjust a temperature in the cabin; an outlet change-over switch 47 to set the air conditioning mode; and a defroster mode switch 37. The above arrangements are basically the same as those of the control panel 30, however, in the case of the control panel 30, the outlet is changed over when a switch is pressed according to each operation mode, on the other hand, in the case of the control panel 31, the outlet is changed over and also the rotational speed of the fan 7 is changed over each time the only outlet change-over switch 47 and the fan control button 46 are pressed. Usually, on the control panel 31, the setting temperatures are displayed, that is, the control panel 31 displays: a PTC temperature display 43 to display the outside air temperature for about 5 seconds by selecting the outside air temperature switch 55; a mode display 41 to display an outlet from which the conditioned air is blown out; and a fan speed display 44 to display a rotational speed of the fan. Further, on the control panel 31, there are provided an intake LED 42 and a defogger LED 48, by which the passenger can visually recognize the present setting of the car air conditioner. Switches provided on the control panel 31 are also connected with the control unit 23.

The control unit 23 is connected with an outside air sensor 17, inside air sensor 19 and sunshine sensor 21 by signal wires. Therefore, pieces of information detected by the above sensors 17, 19, 21 are continuously inputted into the control unit 23. There is provided a microcomputer 51 in the control unit 23. In accordance with the information detected by the sensors, the microcomputer 51 finds a target air blowing temperature and determines the degree of opening of each mode door 2, 11, 12, 13, 15. Then the microcomputer 51 sends a command to each actuator 6, 8, 10 to drive each mode door 2, 11, 12, 13, 15 so that the degree of opening of each mode door 2, 11, 13, 15 can be controlled to this degree of opening.

The control unit 23 is connected with the actuators 6, 8, 10 and the control unit 23 by the communication line 40. The command is transmitted to each actuator 6, 8, 10 via the communication line 40.

Specifically, the control unit 23 sends a command, by which the motor is rotated in a normal or reverse direction, to each actuator 6, 8, 10. When the motor is completely rotated, a switch signal is generated so that the completion of rotation can be informed to the control switch 23. The communication line 40 of this embodiment includes: a line to send a command of opening from the control unit 23 to each actuator 6, 8, 10; and a line to send a signal by which the control unit can detect the completion of rotation of the motor. Due to the above arrangement, the control unit 23 can detect that communication is normally conducted between the control unit 23 and each actuator 6, 8, 10.

The compressor 50 is connected with the control unit 23 and operated in accordance with a command given by the control unit 23.

The fail-safe function of this embodiment is performed in the case where communication is stopped between either of the actuators 6, 8, 10 and the control unit 23. Therefore, this function is defined as the second fail-safe function, which is discriminated from the first fail-safe function performed in the case where the communication line 38 between the control panel 30 and the control unit 23 is cut off. The present invention provides specific arrangements of two types of the second fail-safe functions. In the third embodiment, one of the two types of the second fail-safe function will be explained below.

The fail-safe function of the third embodiment is described as follows. When the communication from the control unit 23 to either the intake door actuator 6 or the mode door actuator 10 is stopped, the compressor 50 is turned on, and the mode which functions normally is automatically changed over to the setting by which the windowpanes are prevented from misting.

Figure 7:
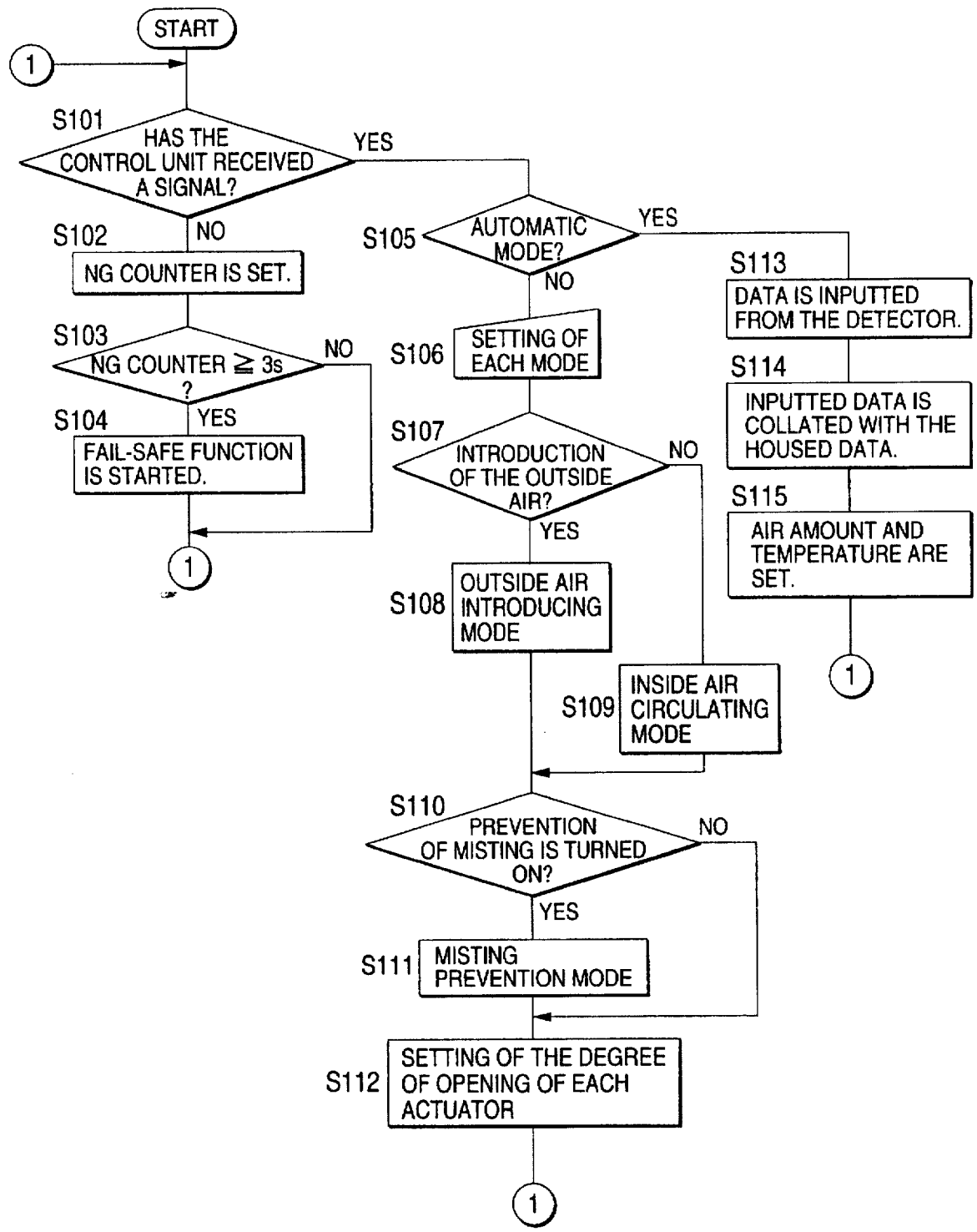
FIG. 7 is a flow chart showing the fail-safe function of the third embodiment of the present invention.

FIG. 7 is a flow chart showing the processing to start the fail-safe function of the third embodiment. This flow chart starts at a point of time when the car air conditioner is turned on.

The fail-safe function of this embodiment is performed irrespective of the manual and automatic operation mode. Therefore, first, the control unit 23 checks whether or not the communication between the control unit 23 and each actuator is normally conducted (S101).

When it is judged that the communication is normally conducted, the control unit 23 judges the operation mode that has been set by a passenger (S105). In the case of judgment in which the air conditioner is controlled by the automatic operation mode, pieces of information about the air in the cabin obtained by the outside air sensor 17, inside air sensor 19 and sunshine sensor 21 are inputted into the control unit 23 (S113).

Also in this embodiment, referring to the housed data, the control unit 23 judges a comfortable temperature for a passenger in accordance with an amount of sunshine and an atmospheric temperature (S114). Then, the amount of air to be blown into the cabin and the temperature are set (S115).

On the other hand, when it has been judged that the control of the manual mode is selected, the setting of each mode (an amount of air, a setting temperature and so forth) manually inputted from the control panel 31 is judged, and also the setting of introducing the outside air and the setting of the misting prevention mode are judged (S106, S107, S108, S109, S110). In accordance with the judgment, the misting prevention mode is set (S111), and the degree of opening of each actuator is set (S112). In this way, the processing of air conditioning performed by the manual mode is completed. In the same manner as that of the embodiment described before, this processing is repeated until the operation of the car air conditioner is changed to the automatic mode by the passenger.

In the case of failure in communication between the control unit 23 and the actuators 6, 10, the NG counter is immediately set (S102). The control unit 23 repeatedly judges whether or not signals are received from the actuators 6, 10 in a period of time of 3 seconds from the start of counting (S103).

When signals are received by the control unit 23 from both actuators 6, 10 in a period of time of 3 seconds from the start of counting conducted by the NG counter, it can be judged that the car air conditioner is normally operating. Accordingly, the program returns to the start, and the processing is continued.

When no commands are inputted after 3 seconds have passed, the program of the car air conditioner of this embodiment proceeds to the subroutine to start the fail-safe function (S104).

Figure 8:
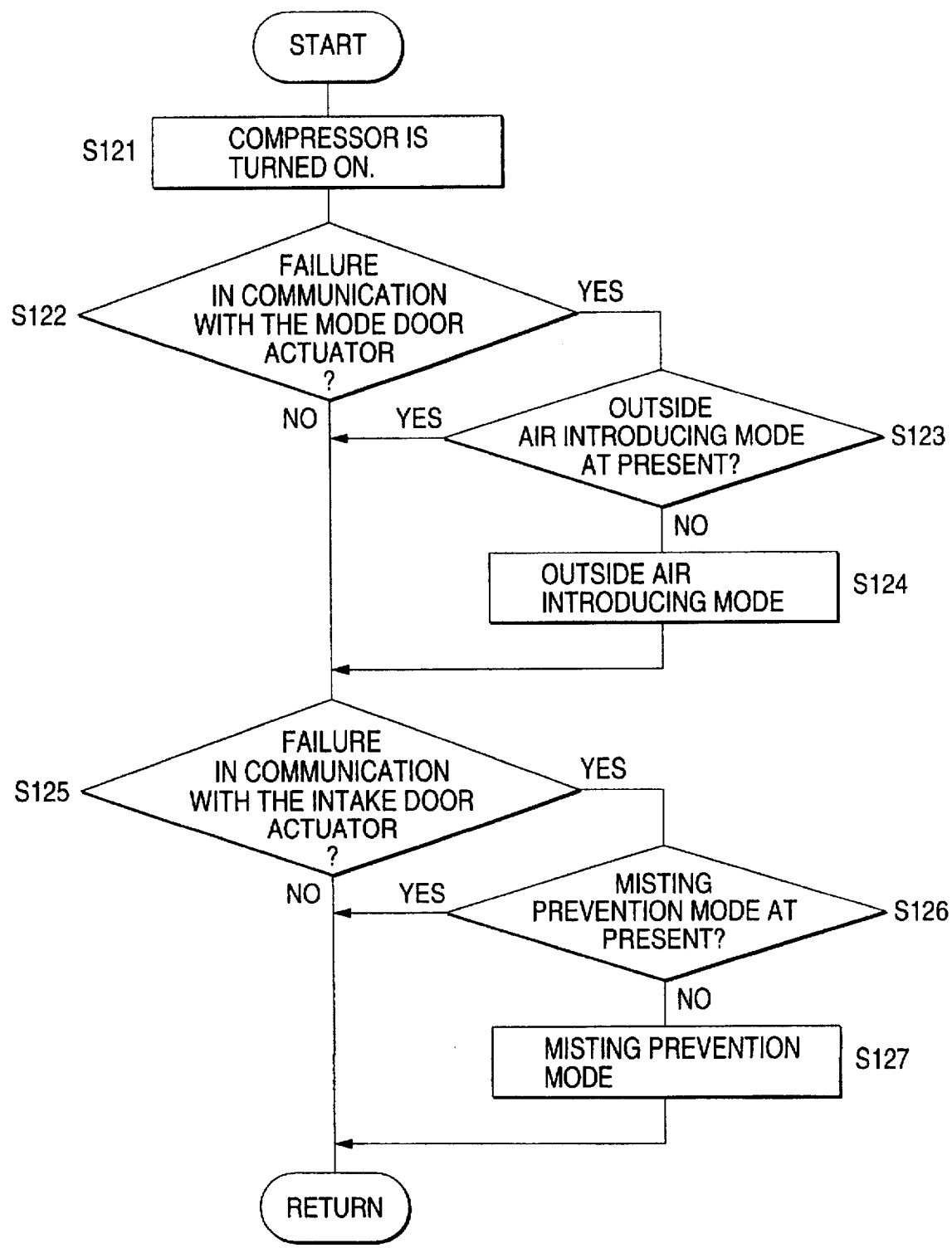
FIG. 8 is a flow chart showing the subroutine of the fail-safe function of the third embodiment of the present invention.

FIG. 8 is a flow chart showing the subroutine of the third embodiment. The fail-safe function of this embodiment starts when a predetermined switch signal is not detected by the control unit 23 and also when it is judged that the communicating function between one of the actuators 6, 10 and the control unit 23 is out of order.

Immediately after the start, the processing to turn on the compressor is performed (S121). Next, the control unit 23 judges whether or not the communication is normally conducted between the control unit 23 and the mode door actuator 10 (S122). When it is found in the judgment that the communication with the mode door actuator 10 is out of order, it is judged whether or not the mode door actuator 10 is set at the outside air introducing mode (S123). When the mode door actuator 10 is not set at the outside air introducing mode, it is set at the outside air introducing mode (S124). When it has already been set at the outside door introducing mode, the program proceeds to the next step as it is.

When it is found in the judgment that the communication with the mode door actuator 10 is in good order, the control unit 23 judges whether or not the communication with the intake actuator 6 is normally conducted (S125). When the communication with the intake actuator 6 is out of order, it is judged whether or not the intake actuator 6 is set at the misting prevention mode (S126). When it is not set at the misting preventing function, it is set at the misting prevention mode (S127). When it has already been set at the misting prevention mode, the program returns to the main flow chart as it is.

In the above embodiment, even if the communication of the control unit with one of the actuators is out of order, it is possible to prevent or remove misting when the operation mode is automatically changed over to a mode in which the windowpanes are prevented from misting by another actuator capable of operating normally.

4th Embodiment

Figure 9:
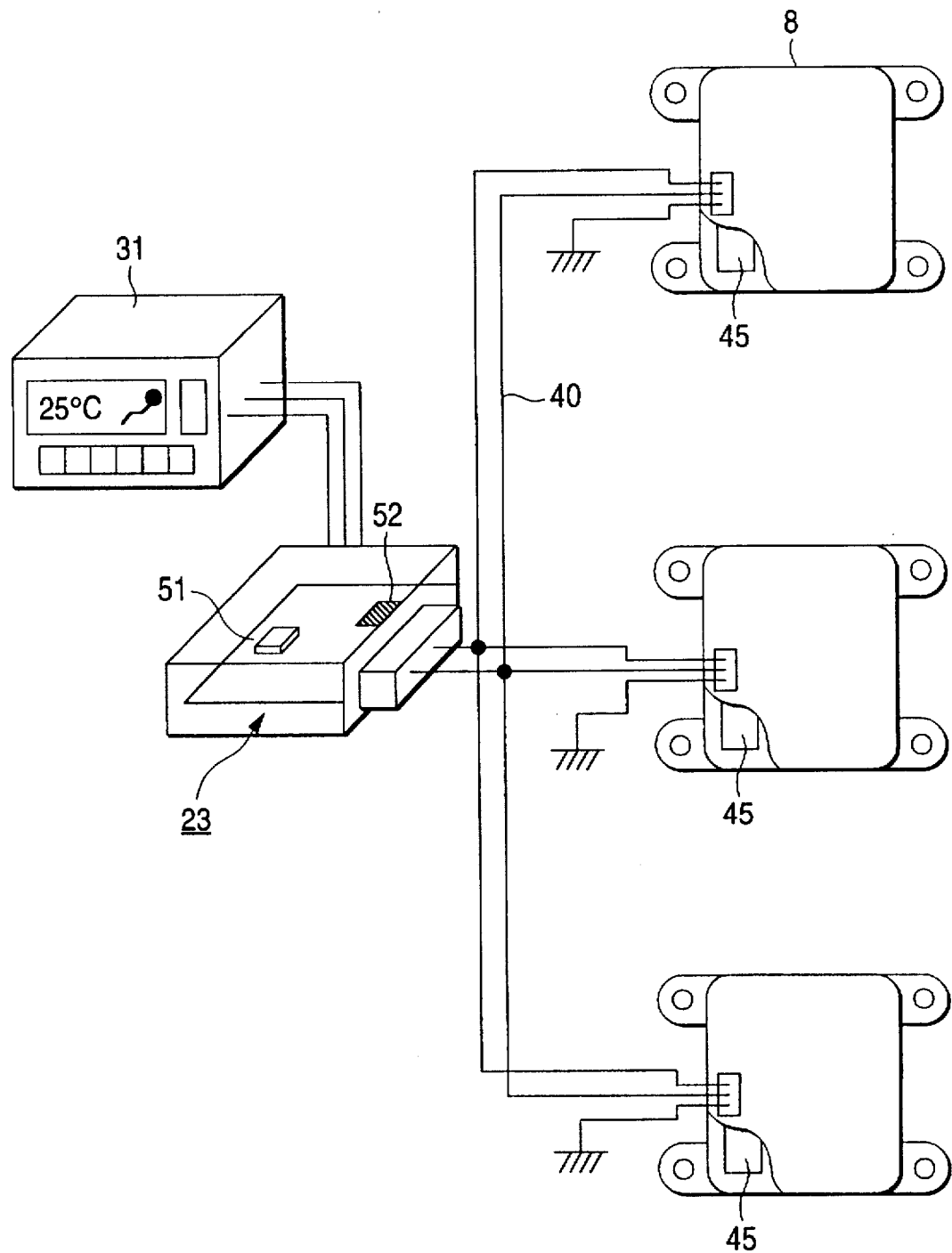
FIG. 9 is a schematic illustration showing the system of the fourth embodiment of the present invention.

FIG. 9 is a schematic illustration of the system of this embodiment.

Figure 10:
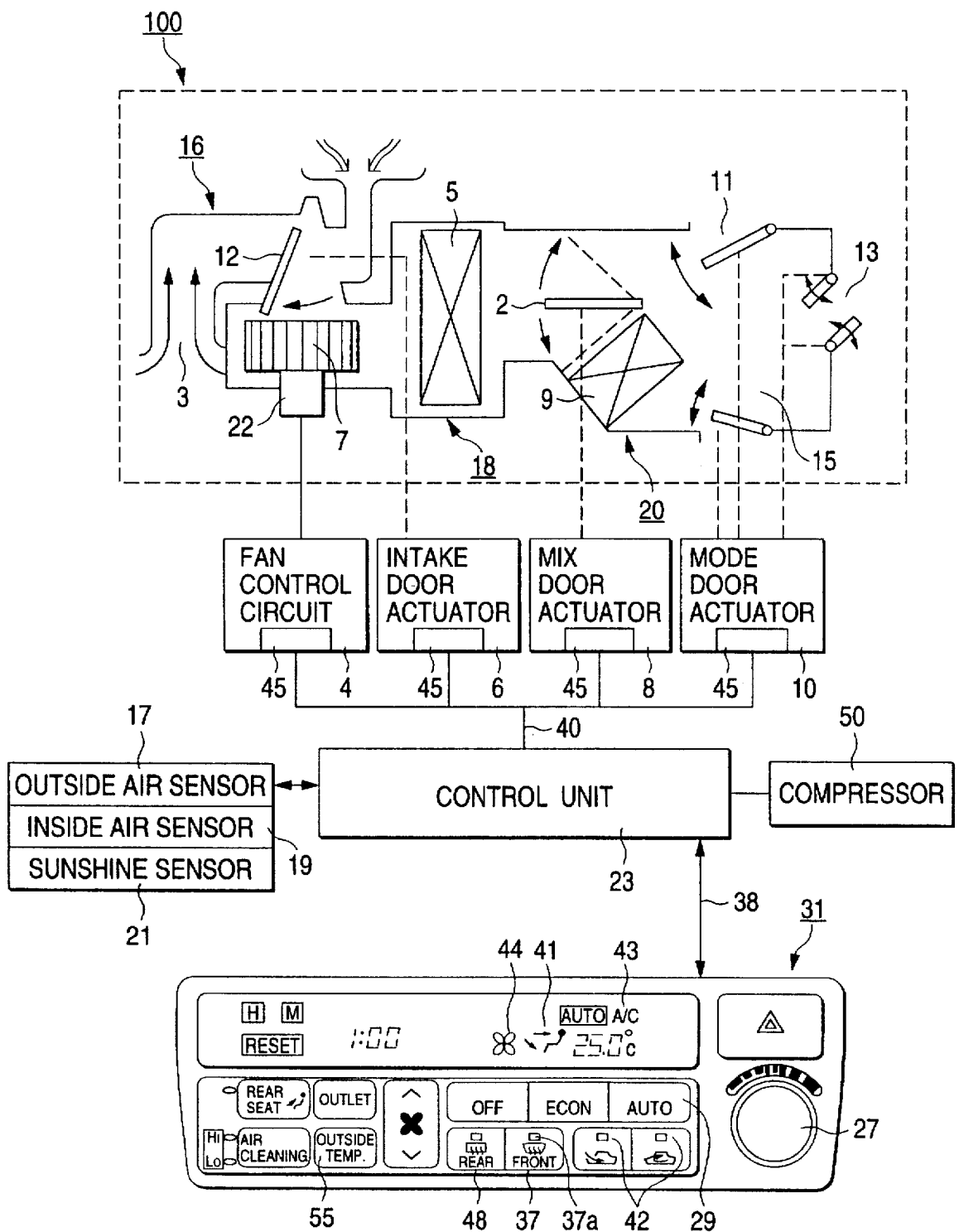
FIG. 10 is a block diagram showing the arrangement of the fourth embodiment of the present invention.

FIG. 10 is a block diagram showing a car air conditioner of the fourth embodiment. Referring to FIGS. 9 and 10, the structure of each portion of the car air conditioner of this embodiment will be explained below.

The car air conditioner of this embodiment is characterized in that: each of the mix door actuator 8, mode door actuator 10 and intake door actuator 6 has a control IC 45 as illustrated in FIG. 9; and the control IC 45 composes a local area network together with the control unit 23 having a microcomputer 51.

As illustrated in FIG. 10, the car air conditioner body 100, control unit 23 and control panel 31 of this embodiment are the same as those described in the third embodiment.

The control unit 23 is connected with the control panel 31 by the communication line 38. Therefore, when the passenger inputs a command onto the control panel 31, it is possible to transmit a predetermined air conditioning state to the control unit. The control unit 23 is connected with the actuators 6, 8, 10 incorporated into the air conditioner body by the communication line 40. Therefore, the actuators 6, 8, 10 are driven so that the air conditioning state can be realized which has been computed by the control unit in accordance with the detection signal inputted from the sensors 17, 19, 21. Each actuator 6, 8, 10 has a control IC 45. Therefore, each actuator 6, 8, 10 can be independently driven by this control IC 45.

In the command sent to each actuator 6, 8, 10 via the communication line 40, a target stopping position of each mode door 2, 11, 12, 13, 15 is added to the address to designate each actuator. In order to confirm that the command has been received, one bit is further added to this command for parity check. By this signal, the control unit 23 detects that the communication is normally conducted between the control unit 23 and the actuators 6, 8, 10.

In order to confirm by the control IC 45 that the communication with the control unit 23 via the communication line 40 is normally performed, a signal to show the operation of each actuator 6, 8, 10 is sent to the control unit 23. One bit is also added to this signal for parity check.

Due to the above arrangement, it is possible for the control IC to detect that the communication is normally performed with the control unit 23.

In this embodiment, the control IC 45 is a custom IC to drive an actuator, and a signal line 40 used for inputting a signal into the control IC 45 and outputting a signal from the control IC 45 is a one-line type communication line capable of conducting a bidirectional communication.

The fourth embodiment has a function which is one of the two functions provided by the second fail-safe function. In this embodiment, the fail-safe function is performed as follows. When the communication of the control unit 23 with the intake door actuator 6 and the mode door actuator 10 is out of order, the compressor 50 is turned on, and an actuator incapable of conducting communication is independently controlled by the control IC 45, so that the windowpanes can be prevented from misting or the misted windowpanes can be cleared. Due to the foregoing, the fail-safe function of this embodiment is carried out by the control IC 45 in parallel with the control unit 23.

Figure 11:
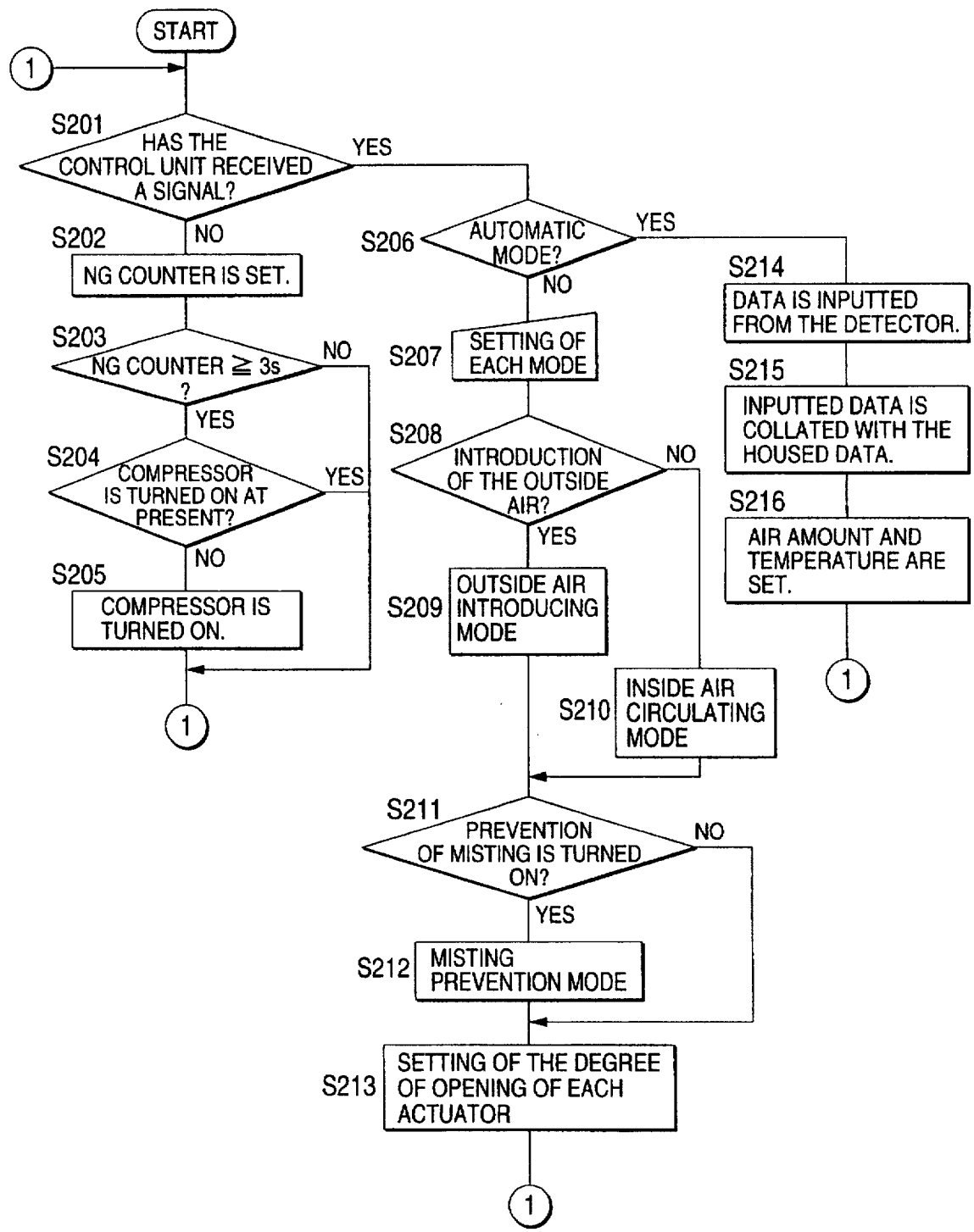
FIG. 11 is a flow chart showing the fail-safe function of the fourth embodiment of the present invention.

FIG. 11 is a flow chart showing the processing conducted in the control unit 23 to start the fail-safe function of the fourth embodiment. This flow chart starts at a point of time when the air conditioner is turned on.

The fail-safe function of this embodiment is performed irrespective of the manual and the automatic mode. Accordingly, first, the control unit 23 checks whether or not the communication with each actuator is normally conducted (S201).

In the case where it is judged that the communication is normally conducted, the same processing as that of the above third embodiment is carried out. That is, the control unit 23 judges a mode that has been set by the passenger (S206). When it is judged that the control of the automatic mode has been selected by the passenger, pieces of information about of the air in the cabin obtained by the detectors such as an outside air sensor 17, inside air sensor 19 and sunshine sensor 21 are inputted into the control unit 23 (S214).

Also in this embodiment, referring to the housed data, the control unit 23 judges a comfortable temperature for a passenger in accordance with an amount of sunshine and an atmospheric temperature (S215). Then, the amount of air to be blown into the cabin and the temperature are set (S216).

On the other hand, when it has been judged that the control of the manual mode is-selected, the setting of each mode (an amount of air, a setting temperature and so forth) manually inputted from the control panel 31 is judged, and also the setting of introducing the outside air and the setting of the misting prevention mode are judged (S207, S208, S209, S210, S211). In accordance with the judgment, the misting prevention mode is set (S212), and the degree of opening of each actuator is set (S213). In this way, the processing of air conditioning performed by the manual mode is completed.

Also, in this embodiment, this processing is repeated until the operation of the car air conditioner is changed to the automatic mode by the passenger.

In the case of failure in communication between the control unit 23 and the actuators 6, 10, the NG counter is immediately set (S202). The control unit 23 repeatedly judges whether or not signals are received from the actuators 6, 10 in a period of time of 3 seconds from the start of counting (S203).

When signals are received by the control unit 23 from both actuators 6, 10 in a period of time of 3 seconds from the start of counting conducted by the NG counter, it can be judged that the communication between the control unit 23 and the actuators 6, 10 is normally conducted. Accordingly, the program returns to the start, and the processing is continued.

When no signal is inputted from either actuator at a point of time after 3 seconds have passed, or alternatively when no signals are inputted from a plurality of actuators, it is judged whether or not the compressor of the car air conditioner is operated at present in this embodiment (S204). When the compressor is not operated, the compressor is started and the program returns to the start point (S205).

Figure 12:
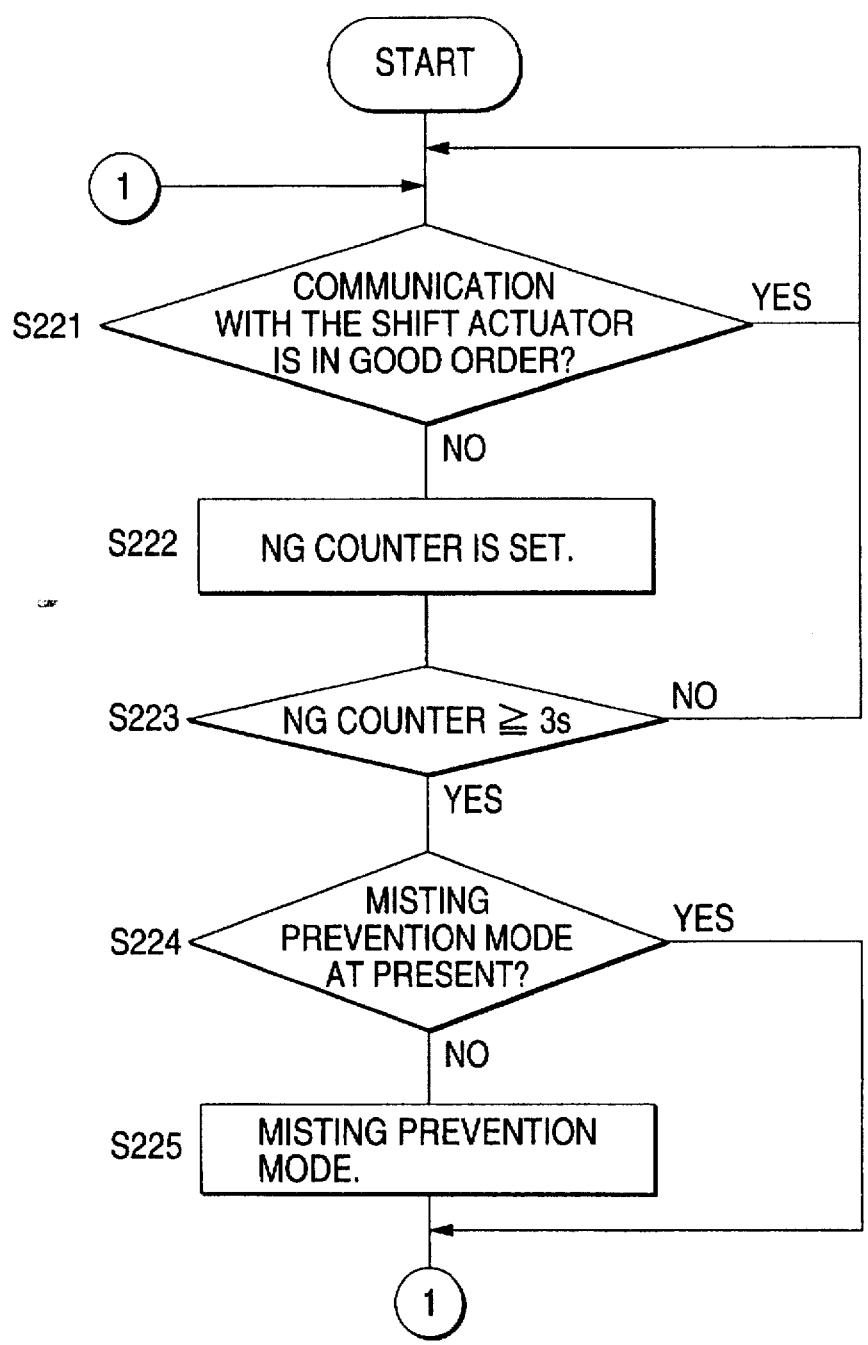
FIG. 12 is a flow chart showing the fail-safe function of the fourth embodiment of the present invention.

FIG. 12 is a flow chart showing the processing of fail-safe function performed by the control IC 45 of the mode door actuator 6 in the fourth embodiment.

In the control IC of the mode door actuator 10, it is judged whether or not the communication with the control unit 23 is in good order (S221). When the communication with the control unit 23 is out of order, the NG counter is immediately set (S222).

In a period of time of 3 seconds from the start of counting, the control IC 45 repeatedly judges whether or not the control unit has received a signal (S223). When a signal is received from the control unit 23 to the control IC 45 of the mode door actuator 10 in a period of time of 3 seconds from the start of counting conducted by the NG counter, it can be judged that the communication between the mode door actuator 10 and the control unit 23 is in good order. Therefore, the program returns to the start, and the processing is continued.

When no signal is inputted even after a period of time of 3 seconds have passed, it is judged that the defrosting door 13 is set at a position of the misting prevention mode (S224). In the case where the defrosting door 13 is not set at the position of the misting prevention mode, it is set at it (S225).

Figure 13:
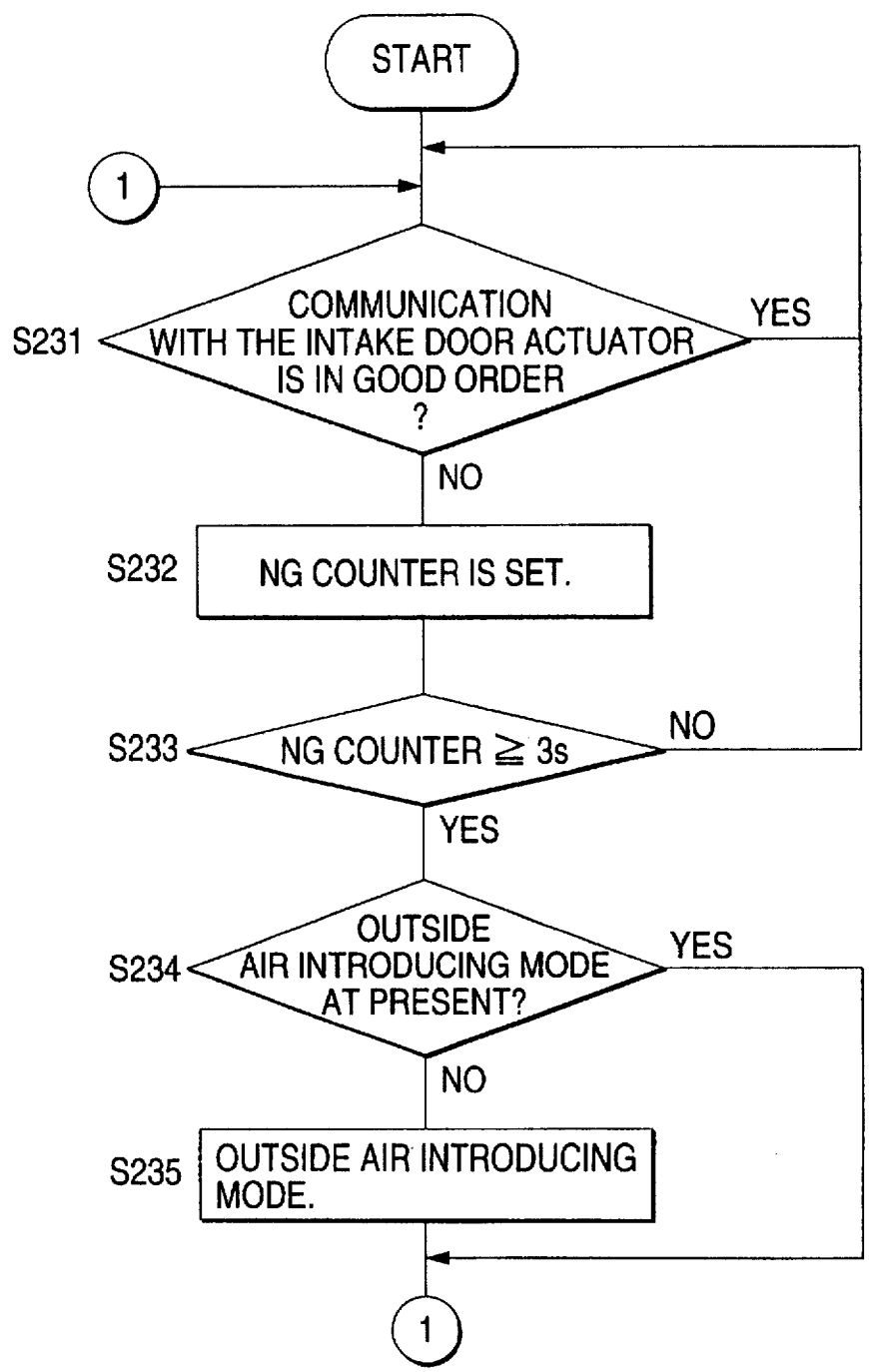
FIG. 13 is a flow chart showing the fail-safe function of the fourth embodiment of the present invention.

FIG. 13 is a flow chart showing the processing of the fail-safe function conducted in the control IC 45 of the intake door actuator 6 in the fourth embodiment.

The control IC 45 of the intake door actuator 6 judges whether or not the communication with the control unit 23 is in good order (S231). In the case of failure in communication, the NG counter is immediately set (S232). Until a period of time of 3 seconds have passed from the start of counting, the control IC 45 repeatedly judges whether or not a signal is received from the control unit 23 (S233).

When the control unit 23 receives a signal from the intake door actuator 6 until a period of time of 3 seconds have passed from the start of counting of the NG counter, it can be judged that the communication between the intake door 6 and the control unit 23 is in good order. Therefore, the program returns to the start point and the processing is continued.

When no signal is inputted even after a period of time of 3 seconds have passed, it is judged that the intake door 12 is set at a position of the outside air introducing mode (S234). In the case where the intake door 12 is not set at the position of the outside air introducing mode, it is set at it (S235).

In the above embodiment, in the case of failure in the communication among the control panel, actuator and control unit, it is possible to control the actuator by the control IC so that the windowpanes can be prevented from misting and so that the misting can be removed from the windowpanes.

When a local area network (LAN) is constructed for the communication to be conducted between the control unit and the actuators, it is possible to reduce the communication line, and also it is possible to reduce the actuator driving circuit in the control unit. Therefore, the car air conditioner can be made compact and its weight can be reduced.

5th Emobdiment

The fifth embodiment of the present invention will be explained below.

It is possible to apply the fifth embodiment to any of the arrangements of the car air conditioners shown in the above system diagrams and the block diagrams of the embodiment. In the following explanations, reference numeral 31 is attached to the control panel.

Figure 14:
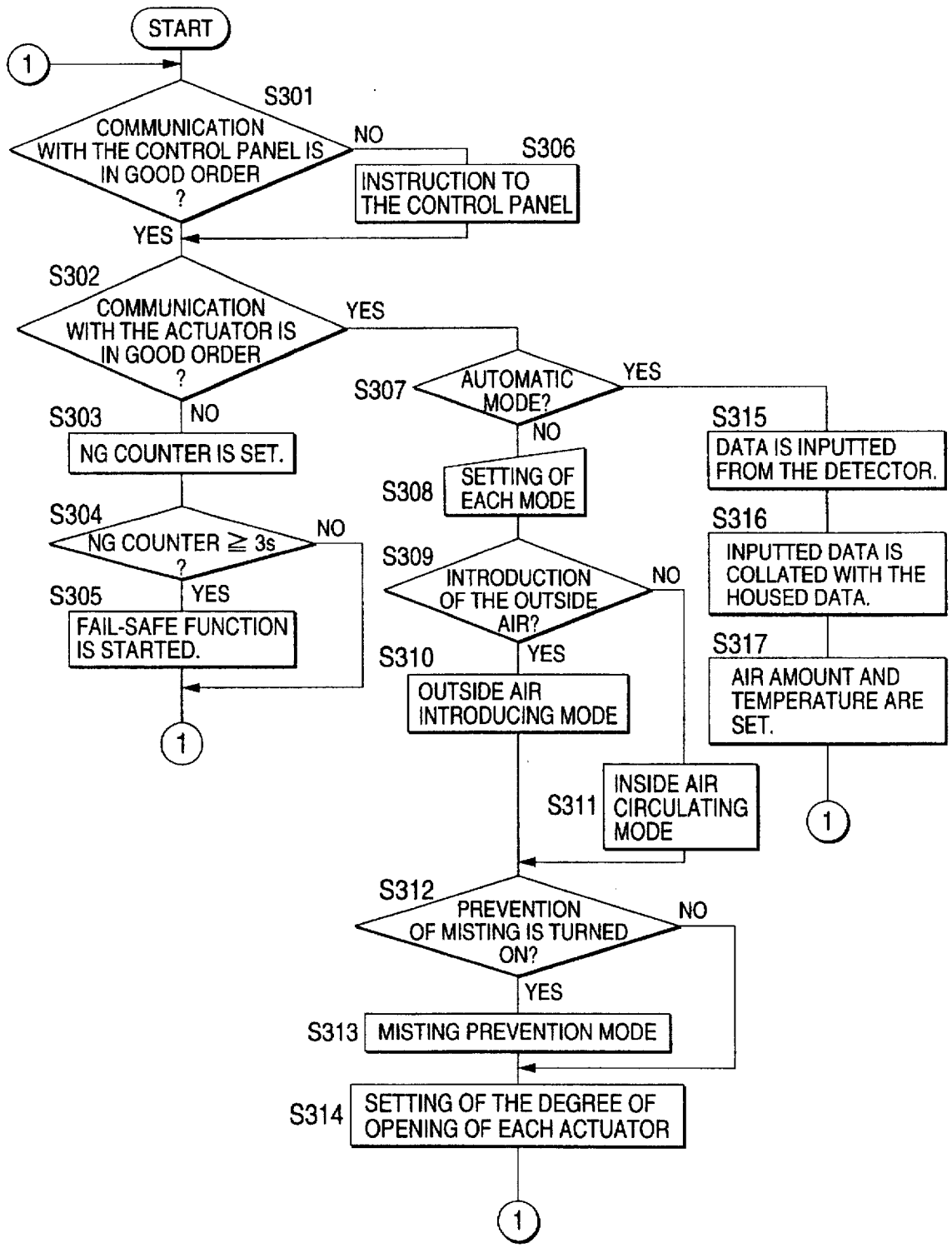
FIG. 14 is a flow chart showing the fail-safe function of the fifth embodiment of the present invention.

FIG. 14 is a flow chart showing the processing conducted to start the fail-safe function of the fifth embodiment. This flow chart starts at a point of time when the air conditioner is turned on.

The fail-safe function of this embodiment is performed irrespective of the manual and the automatic mode. Accordingly, first, the control unit 23 checks whether or not the communication with the control panel is normally conducted (S301). As a result of judgment, when it is found that the communication is abnormal, this information is sent to the control panel 31 and displayed on it, so that the passenger can know the occurrence of abnormality (S306).

Next, it is judged whether or not the communication with each actuator is normally performed (S302). When the communication is normally performed, the same processing as that of the third or the fourth embodiment is conducted. Therefore, the explanations will be omitted here.

When the communication is not normally conducted between the control unit 23 and the actuators 6, 8, 10, the NG counter is immediately set (S303). Until a period of time of 3 seconds have passed from the start of counting, the control unit 23 repeatedly judges whether or not signals are received from the actuators 6, 8, 10 (S304).

When signals are inputted from all actuators 6, 8, 10 into the control unit 23 in a period of time of 3 seconds from the start of counting conducted by the NG counter, it can be judged that the communication between the control unit 23 and the actuators 6, 10 is normally conducted. Therefore, the program returns to the start point and the processing is continued.

When no signals are inputted into the control unit 23 even after a period of time of 3 seconds have passed, the fail-safe function of the fifth embodiment is started (S305).

Figure 15:
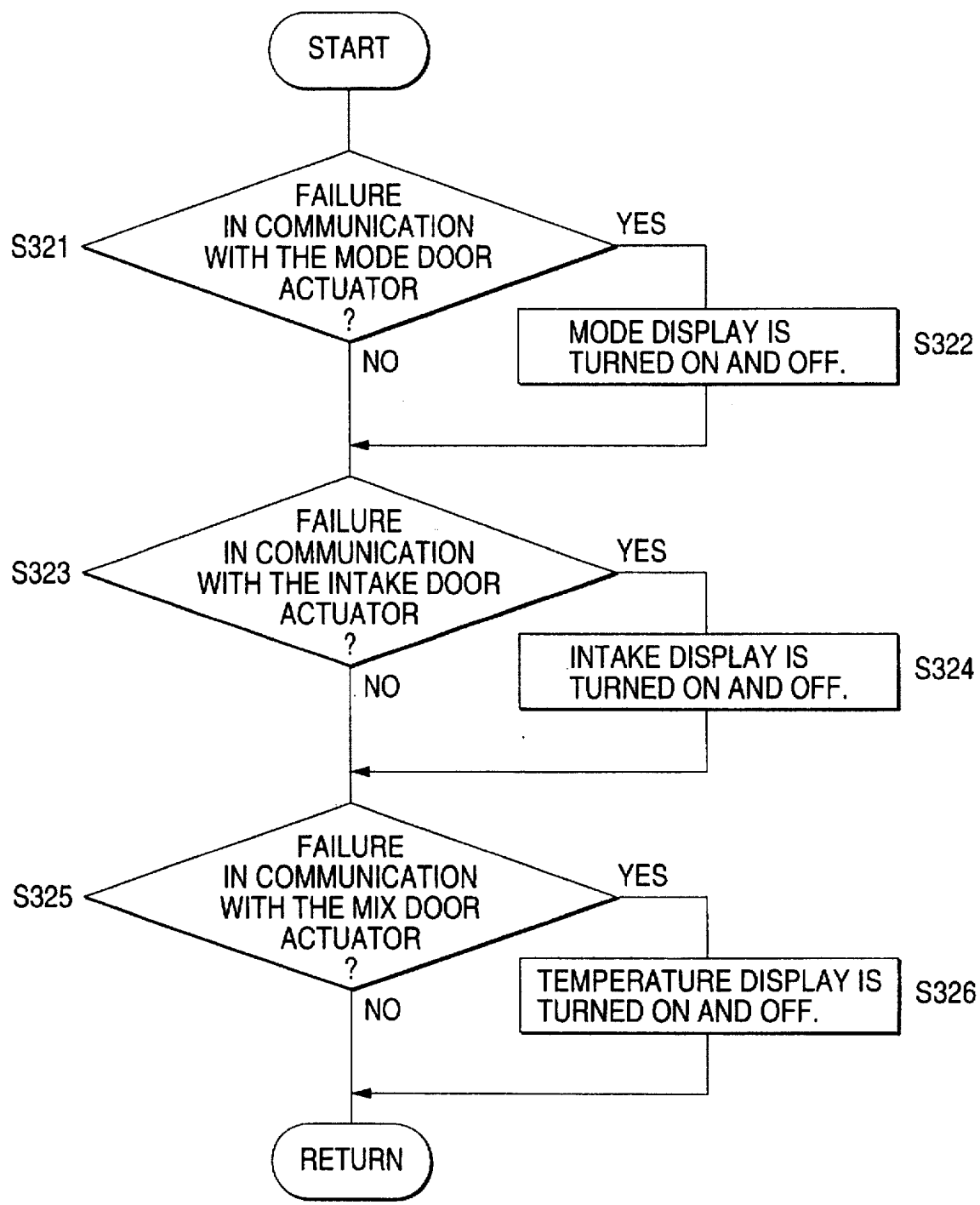
FIG. 15 is a flow chart showing the subroutine of the fifth embodiment of the present invention.

FIG. 15 is a flow chart of the subroutine to explain the fail-safe function of the fifth embodiment.

The characteristic of this embodiment is described as follows. In the case of failure in communication between the control unit 23 and either of the actuators 6, 8, 10, the passenger is made to know the actuator which is out of order. Alternatively, when the setting of the car air conditioner is automatically changed by applying other fail-safe function together with the fail-safe function of this embodiment, the passenger is made to know that the change in the setting is not because of malfunction of the car air conditioner.

The control unit 23 first checks the actuators 6, 8, 10, so that the actuator which is out of order can be found. First, the control unit 23 checks the communicating function of the mode door actuator 10 (S321). As a result, when the communication with the mode door actuator 10 is out of order, a mode display 41 on the control panel 31 is turned on and off, so that the passenger can be made to know that the communication with the mode door actuator 10 is out of order (S322).

Next, the communicating function of the intake door actuator 6 is checked (S323). In the case of failure in communication with the mode door actuator 6, a display 42 of intake LED, which is arranged on the control panel 31, is turned on and off, so that the passenger can be made to know that the communication with the intake actuator 6 is out of order (S324).

Finally, the communicating function of the mix door actuator 8 is checked (S325). In the case of failure in communication with the mix door actuator 8, a display 43 of temperature arranged on the control panel 31 is turned on and off, so that the passenger can be made to know that the communication with the mix door actuator 8 is out of order (S326).

The above display is turned on and off until the car air conditioner is stopped.

According to the above embodiment, in the case of failure in communication between the control panel and the control unit or between the actuator and the control unit, it is possible to let the passenger know the occurrence of failure immediately. When the other fail-safe function is also applied to this embodiment, and when the setting of the car air conditioner is automatically changed by the applied function, the passenger can be made to know that the change in the setting is not because of malfunction but because of the fail-safe function.

According to the present invention, even in the case of failure in communication between the control unit and the air conditioning executing means, it is possible to solve the problems of misting on the windowpanes, so that the visibility can be maintained in a good condition.

Further, even in the case of failure in communication between the control unit and the air conditioning executing means or between the control unit and the operation means, the passenger can be made to know the failure in communication immediately, so that the problems of misting on the windowpanes can be solved. By using this -function together with other fail-safe functions, when the setting of the car air conditioner is automatically changed, the passenger can be made to know that the change is caused by the fail-safe function.

What is claimed is:

1. An air conditioner for automobile use comprising:
    a detector (17,19,21) for detecting environment outside and inside a cabin;
    control means (23) for controlling a temperature in the cabin in accordance with a detection of the detector (17,19,21) to a temperature desired by a passenger;
    a compressor (50) operating and stopping in accordance with a command given by the control means (23);
    a plurality of air conditioning executing means (6,8,10) for executing air conditioning in the cabin;
    communicating means (40) for conducting communication between the control means (23) and the air conditioning executing means (6,8,10);
    communication judging means (23) for judging whether the communication between the control means (23) and the air conditioning executing means (6,8,10) is normally conducted or not; and
    mist preventing means for realizing an air conditioning state in which a windowpanes are prevented from being misted when it is judged by the communication judging means (23) that the communication is not conducted normally.

2. The air conditioner for automobile use according to claim 1, wherein the mist preventing means includes a change-over means for changing over one of the air conditioning executing means (6,8,10), which is judged by the communication judging means (23) to be out of order, to the other air conditioning executing means (6,8,10), which is judged by the communication judging means (23) to be in good order.

3. The air conditioner for automobile use according to claim 2, wherein the mist preventing means further includes: an outside air introducing means (6,12) for introducing outside air; and mist removing means (10,13) for removing mist by blowing hot air to the windowpanes.

4. The air conditioner for automobile use according to claim 1, wherein the plurality of air conditioning executing means (6,8,10) respectively have execution control means (45), and the air conditioning executing means judged to be out of order by the communication judging means (23) is controlled by the execution control means concerned (45).

5. The air conditioner for automobile use according to claim 1, further comprising a communication display means (31) for displaying a judgment of the communication judging means (23), wherein the communication display means (31) automatically displays a disorder of the communication when it is judged by the communication judging means (23) that the communication between the air conditioning executing means (6,8,10) and the control means (23) is not conducted normally.

6. The air conditioner for automobile use according to claim 2, further comprising a communication display means (31) for displaying a judgment of the communication judging means (23), wherein the communication display means (31) automatically displays a disorder of the communication when it is judged by the communication judging means (23) that the communication between the air conditioning executing means (6,8,10) and the control means (23) is not conducted normally.

7. The air conditioner for automobile use according to claim 3, further comprising a communication display means (31) for displaying a judgment of the communication judging means (23), wherein the communication display means (31) automatically displays a disorder of the communication when it is judged by the communication judging means (23) that the communication between the air conditioning executing means (6,8,10) and the control means (23) is not conducted normally.

8. The air conditioner for automobile use according to claim 4, further comprising a communication display means (31) for displaying a judgment of the communication judging means (23), wherein the communication display means (31) automatically displays a disorder of the communication when it is judged by the communication judging means (23) that the communication between the air conditioning executing means (6,8,10) and the control means (23) is not conducted normally.

9. A computer program product executable with a microcomputer and a drive IC and used for an air conditioner in an automobile, wherein a detector detects environment outside and inside a cabin, control means controls a temperature in the cabin in accordance with a detection of the detector to a temperature desired by a passenger, and a plurality of air conditioning executing means for executing air conditioning in the cabin, comprising:

program code means for judging whether a communication between the control means and the air conditioning executing means is normally conducted or not; and program code means for controlling the air conditioning executing means so as to prevent a windowpanes from being misted when it is judged by the judging means that the communication is not conducted normally.

10. The computer program product according to claim 9, wherein the controlling program code means includes a change-over program code means for changing over one of the air conditioning executing means which is judged by the judging program code means to be out of order, to the other air conditioning executing means which is judged by the judging program code means to be in good order.

11. The computer program product according to claim 9, further comprising program code means for driving the respective plurality of air conditioning executing means, and the air conditioning executing means judged to be out of order by the judging program code means is controlled by the driving program code means concerned.

12. The computer program product according to claim 9, further comprising program code means for transmitting a communication display means provided in the air conditioner of a judgment of the judging program code means, wherein the communication display means automatically displays a disorder of a communication between the air conditioning executing means and the control means judged by the judging program code means.

13. The computer program product according to claim 10, further comprising program code means for transmitting a communication display means provided in the air conditioner of a judgment of the judging program code means, wherein the communication display means automatically displays a disorder of a communication between the air conditioning executing means and the control means judged by the judging program code means.

14. The computer program product according to claim 11, further comprising program code means for transmitting a communication display means provided in the air conditioner of a judgment of the judging program code means, wherein the communication display means automatically displays a disorder of a communication between the air conditioning executing means and the control means judged by the judging program code means.

* * * * *